US009016781B2

(12) United States Patent
Cheng et al.

(10) Patent No.: US 9,016,781 B2
(45) Date of Patent: Apr. 28, 2015

(54) CHILD SAFETY SEAT ASSEMBLIES

(71) Applicant: Wonderland Nurserygoods Company Limited, Central Hong Kong (HK)

(72) Inventors: Chin-Ming Cheng, Central Hong Kong (HK); Yu-Ya Su, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 32 days.

(21) Appl. No.: 13/678,688

(22) Filed: Nov. 16, 2012

(65) Prior Publication Data

US 2013/0175832 A1    Jul. 11, 2013

Related U.S. Application Data

(60) Provisional application No. 61/560,808, filed on Nov. 17, 2011.

(51) Int. Cl.
| | |
|---|---|
| *B60N 2/28* | (2006.01) |
| *B60N 2/015* | (2006.01) |
| *A47C 1/08* | (2006.01) |
| *A47D 1/10* | (2006.01) |
| *B60N 2/427* | (2006.01) |
| *B60N 2/42* | (2006.01) |
| *B60N 2/68* | (2006.01) |

(52) U.S. Cl.
CPC .............. *B60N 2/43* (2013.01); *B60N 2/2821* (2013.01); *B60N 2/2884* (2013.01); *B60N 2/2887* (2013.01); *B60N 2/42709* (2013.01); *B60N 2/682* (2013.01)

(58) Field of Classification Search
USPC ............ 297/253, 256.16, 472, 216.11, 216.1, 297/250.1, 216.18, 471
See application file for complete search history.

(56) References Cited

U.S. PATENT DOCUMENTS

| | | | |
|---|---|---|---|
| 5,286,058 A * | 2/1994 | Wier | 280/808 |
| 5,685,603 A | 11/1997 | Lane, Jr. | |
| 6,089,653 A * | 7/2000 | Hotaling et al. | 297/130 |
| 6,425,632 B1 * | 7/2002 | Anthony et al. | 297/250.1 |
| 6,796,610 B2 * | 9/2004 | Nakagawa et al. | 297/256.16 |
| 8,220,118 B2 * | 7/2012 | Buckingham et al. | 24/599.1 |
| 8,226,162 B2 * | 7/2012 | Campbell et al. | 297/216.11 |
| 8,291,555 B2 * | 10/2012 | Buckingham et al. | 24/599.1 |
| 8,393,679 B2 * | 3/2013 | Longenecker et al. | 297/256.16 |
| 8,424,964 B2 * | 4/2013 | Campbell et al. | 297/216.11 |
| 8,454,809 B2 * | 6/2013 | Maldonado Ramirez De Arellano | 204/278.5 |
| 2002/0074840 A1 | 6/2002 | Nakagawa et al. | |
| 2003/0209926 A1 * | 11/2003 | Nakagawa et al. | 297/256.16 |

(Continued)

FOREIGN PATENT DOCUMENTS

| | | |
|---|---|---|
| DE | 19946056 A1 | 3/2001 |
| DE | 10047790 A1 | 3/2002 |
| DE | 202007012746 U1 | 1/2008 |
| DE | 102007056373 A1 | 5/2009 |

(Continued)

*Primary Examiner* — Jeanette E. Chapman
(74) *Attorney, Agent, or Firm* — David I. Roche; Baker & McKenzie LLP

(57) ABSTRACT

A child safety seat assembly includes a support base, and a child safety seat arranged on the support base. The support base includes a shell body, a latch assembly operable to fixedly attach the shell body with an anchorage fixture of a vehicle, and a cushion structure coupled with the shell body, wherein the cushion structure is operable to allow a cushioned displacement of the shell body relative to the latch assembly when the child safety seat is subject to collision.

19 Claims, 21 Drawing Sheets

(56) References Cited

U.S. PATENT DOCUMENTS

2007/0284924 A1* 12/2007 Gold et al. .................... 297/253
2009/0261640 A1* 10/2009 Christ et al. .................. 297/253

FOREIGN PATENT DOCUMENTS

| EP | 2230125 A1 | 9/2010 |
| WO | 2005108155 A1 | 11/2005 |

* cited by examiner

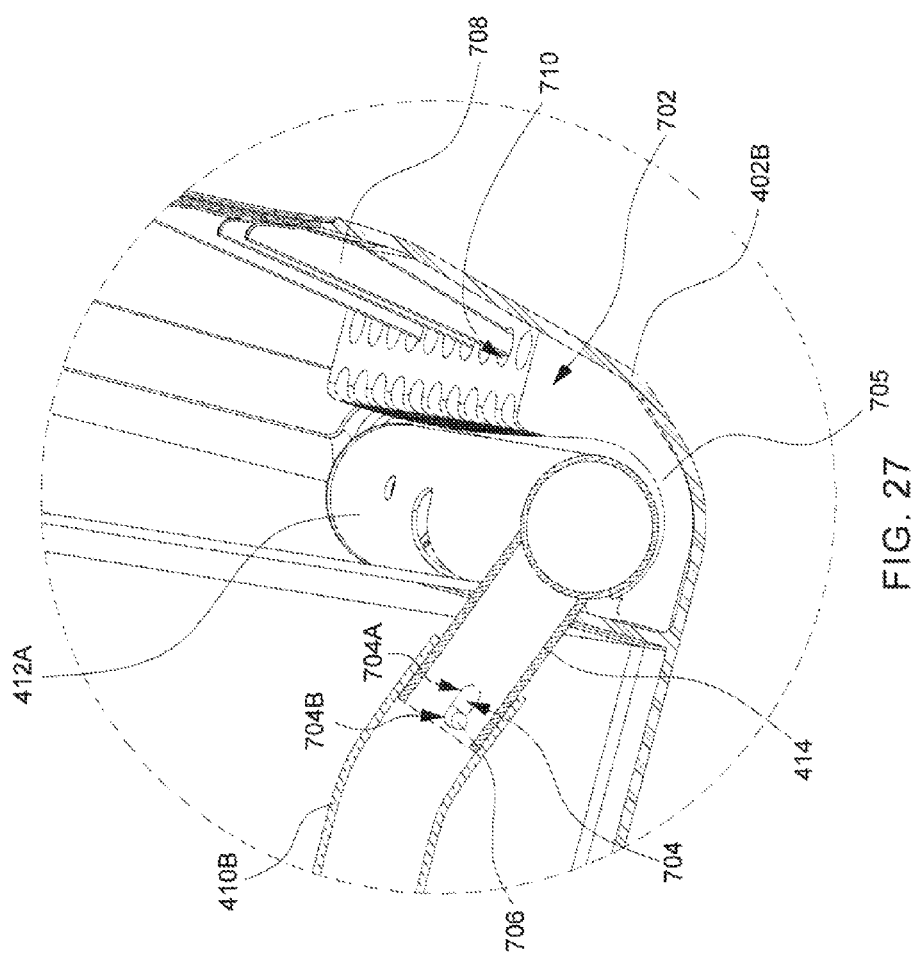

(1)

CHILD SAFETY SEAT ASSEMBLIES

CROSS-REFERENCE TO RELATED APPLICATION

This application claims priority to U.S. Provisional Patent Application No. 61/560,808 filed on Nov. 17, 2011, which is incorporated herein by reference.

BACKGROUND

1. Field of the Invention

The present inventions relate to child safety seat assemblies.

2. Description of the Related Art

A child safety seat is usually required to seat a young child in a vehicle for protecting the child during crash collision. The child safety seat can be attached on the vehicle passenger's seat with the seatbelt of the vehicle. However, the use of the seatbelt for fastening the child safety seat may be inconvenient, and result in erroneous installation that fails to protect the child during collision.

Another approach proposes to incorporate a standardized latch system (i.e., ISOFIX standard) in the child safety seat through which the seat can be securely attached with an anchorage fixture provided in the vehicle. Because the ISOFIX latch system provides a tight hold of the child safety seat, the energy resulting from a crash collision may be substantially transmitted to the child and cause injury.

Therefore, there is a need for a child safety seat that can address at least the aforementioned issues.

SUMMARY

The present application describes child safety seat assemblies that include a support base, and a child safety seat arranged on the support base. In one embodiment, the support base includes a shell body, a latch assembly operable to fixedly attach the shell body with an anchorage fixture of a vehicle, and a cushion structure coupled with the shell body, wherein the cushion structure is operable to allow a cushioned displacement of the shell body relative to the latch assembly when the child safety seat is subject to collision.

BRIEF DESCRIPTION OF THE DRAWINGS

FIG. 27 is a schematic view illustrating exemplary operation of the cushion structure shown in FIG. 25 when the support base is installed in a vehicle.

DETAILED DESCRIPTION OF THE EMBODIMENTS

The present application describes child safety seat assemblies that include a support base, and a child safety seat arranged on the support base. In one embodiment, the support base includes a shell body, a latch assembly operable to fixedly attach the shell body with an anchorage fixture of a vehicle, and a cushion structure coupled with the shell body, wherein the cushion structure is operable to allow a cushioned displacement of the shell body relative to the latch assembly when the child safety seat is subject to collision.

Figure 1:
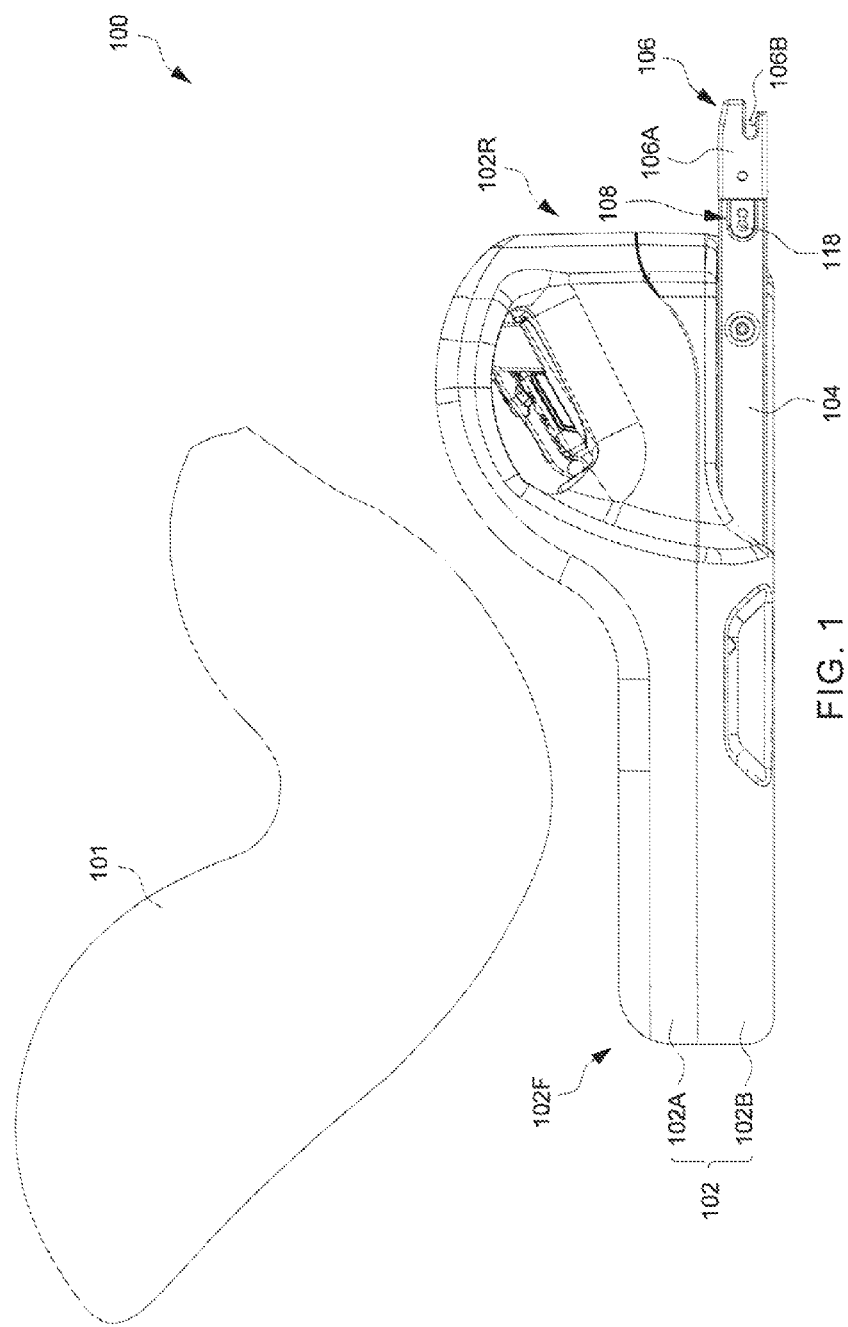
FIG. 1 is a schematic view illustrating an embodiment of a support base for a child safety seat.
Figure 2:
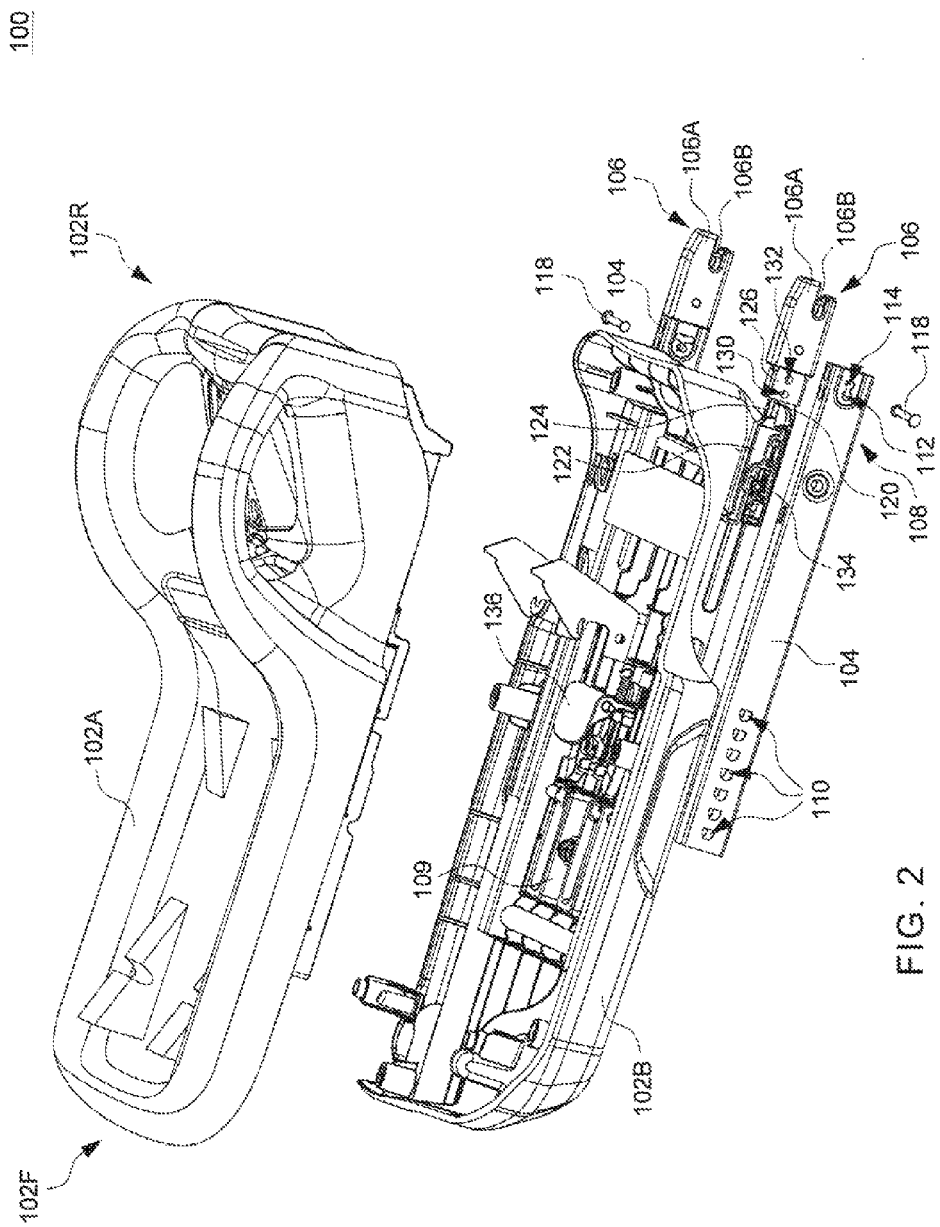
FIG. 2 is a schematic view illustrating a construction of the support base shown in FIG. 1.

FIG. 1 is a schematic view illustrating an embodiment of a support base 100 for a child safety seat, and FIG. 2 is a schematic view illustrating a construction of the base 100. The support base 100 can include a shell body 102, and two adjustable arms 104 having distal ends respectively provided with latch assemblies 106 and cushion structures 108. The shell body 102 can be formed from the assembly of upper and lower housing parts 102A and 102B, and have a rear 102R and a front 102F. The upper housing part 102A can have an upper outward surface having a construction adapted to detachably support a child safety seat 101.

The adjustable arms 104 can be movably assembled through the shell body 102 transversally spaced apart from each other, and can be movable along a lengthwise axis of the shell body 102 that extends from the rear 102R to the front 102F. A portion of the arms 104 away from the end where the latch assembly 106 is mounted can include a plurality of locking openings 110 disposed along the lengthwise axis of the shell body 102. The interior of the shell body 102 may also include at least one locking member (not shown) movable transversally to engage with and disengage from any one of the locking openings 110 to lock the arms 104 in place. Accordingly, the arms 104 can be operable to adjust a length at which the latch assemblies 106 extend from the rear 102R of the shell body 102. An actuator mechanism 109 may be operable to unlock the arms 104.

The two latch assemblies 106 can be respectively arranged adjacent to the distal ends of the two arms 104, and can be operable to lock and unlock with respect to an anchorage fixture provided in a vehicle. Each latch assembly 106 can include an outer casing 106A that can enclose a locking hook 106B.

For operating the latch assemblies 106, each of the arms 104 can have an interior in which an extension 120, a sliding part 122 having a projection 124, and a bracket 126 can be installed. The bracket 126 can be affixed with the latch assembly 106, in particular with the outer casing 106A of the latch assembly 106. The extension 120 can be affixed with the outer casing 106A of the latch assembly 106, and protrude forward from the bracket 126 along the lengthwise axis of the arm 104. The bracket 126 can have a sidewall provided with two holes 130 and 132 spaced apart from each other along the lengthwise axis of the arm 104. A spring 134 can be connected between the sliding part 122 and the extension 120. The projection 124 fixedly joined with the sliding part 122 can be disposed through the bracket 126 and through the interior of the outer housing 106A. An actuator mechanism 136 may be assembled with the lower housing part 102B, and can be coupled with the sliding parts 122 via transmission cables (not shown). The actuator mechanism 136 can be operable to switch the locking hooks 106B from a locking state to an unlocking state for permitting detachment of the support base 100 from the anchorage fixture of the vehicle.

Figure 3:
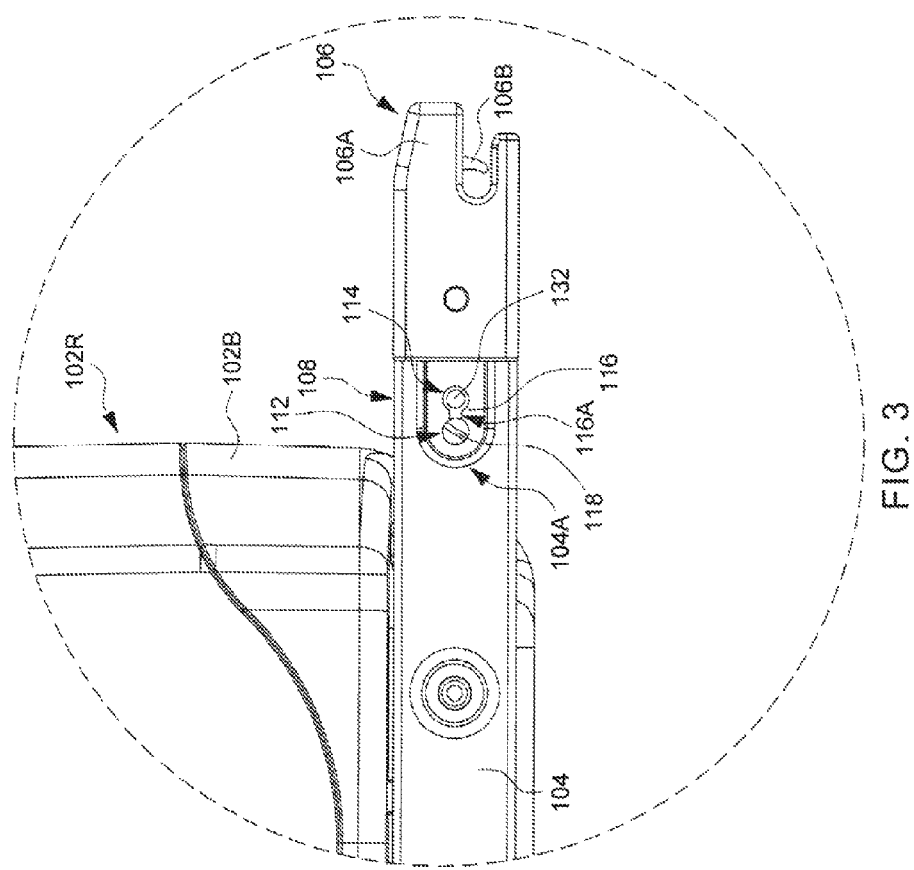
FIG. 3 is an enlarged view illustrating one cushion structure shown in FIG. 2.

FIG. 3 is an enlarged view illustrating one cushion structure 108 shown in FIG. 2. The cushion structures 108 can be disposed symmetrically adjacent to the two adjustable arms 104, and have a same construction. The cushion structures 108 can be coupled with the shell body 102, and are configured to allow a cushioned displacement of the shell body 102 relative to the latch assemblies 106 when collision occurs. Each cushion structure 108 can include a rear portion 104A of each arm 104 having two holes 112 and 114 that are separated from each other via a solid cushioning portion 116 having a slit 116A. The cushioning portion 116 can be made of the material of the arm 104, and is located adjacent to the holes 112 and 114. The holes 112 and 114 may be located in a region of the adjustable arm 104 adjacent to the outer housing 106A of the latch assembly 106, and may be spaced apart from each other along the lengthwise axis of the arm 104. The slit 116A can be connected between the two holes 112 and 114, and is narrower than the holes 112 and 114. A fastener such as a rivet 118 can be respectively engaged through the hole 112 of the arm 104 and the hole 130 of the bracket 126 to affix the bracket 126 with the arm 104 associated therewith. The rivet 118 passing through the hole 112 can be in contact with the cushioning portion 116.

Figure 4:
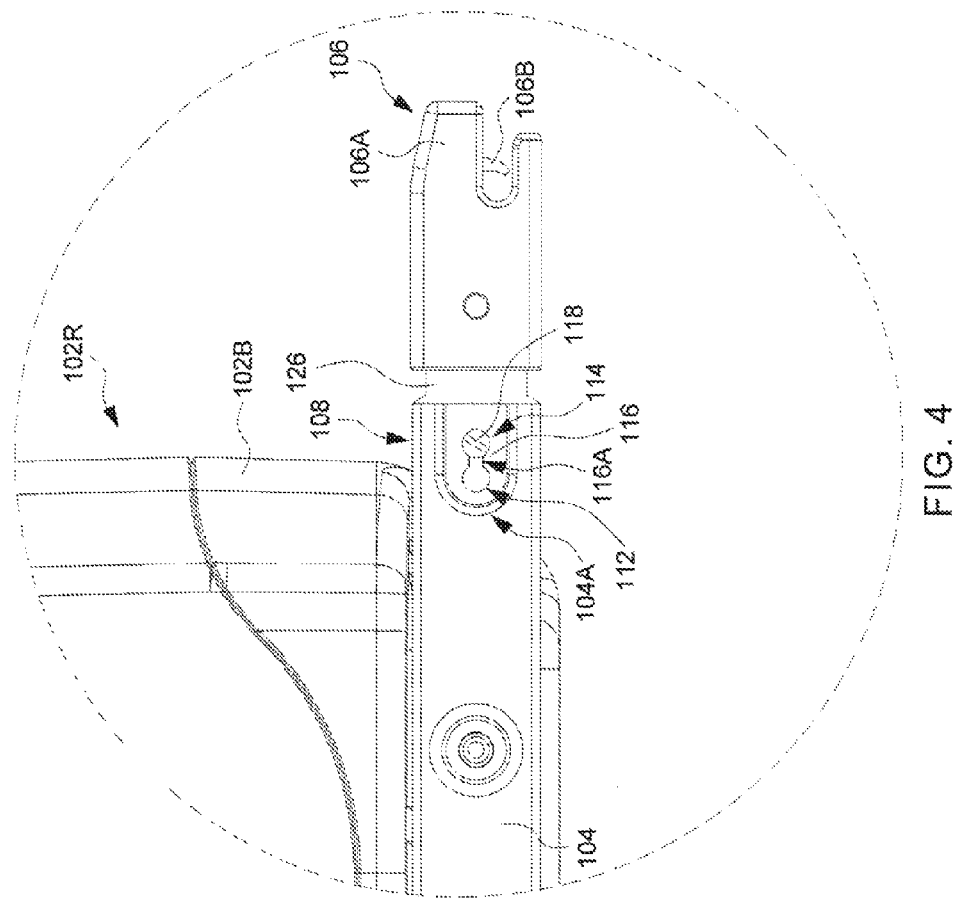
FIG. 4 is a schematic view illustrating an operation of the cushion structure provided in the support base of FIG. 1 when installed in a vehicle.

FIG. 4 is a schematic view illustrating an operation of the cushion structure 108 when the support base 100 is installed in a vehicle. In case the vehicle is subject to a sudden colliding force parallel to the lengthwise axis of the shell body 102 (e.g., when the collision occurs at the front of the vehicle), the inertia of the support base 100 may cause the shell body 102 and the arms 104 to displace away from the attachment points of the latch assemblies 106 with the anchorage fixture of the vehicle. As a result, each rivet 118 affixed with one associated latch assembly 106 can be urged to push against the cushioning portion 116, and move from the hole 112 through the cushioning portion 116 to the hole 114. In particular, the shaft portion of the rivet 118 can have a diameter that is slightly larger than the slit 116A, which causes deformation (e.g., plastic deformation) of the slit 116A for absorbing a part of the collision energy as the rivet 118 moves from the hole 112 to the hole 114. This cushioned displacement of the shell body 102 and the arms 104 relative to the latch assemblies 106 can dissipate a part of the collision energy to reduce the risk of injury to the child.

Figure 5:
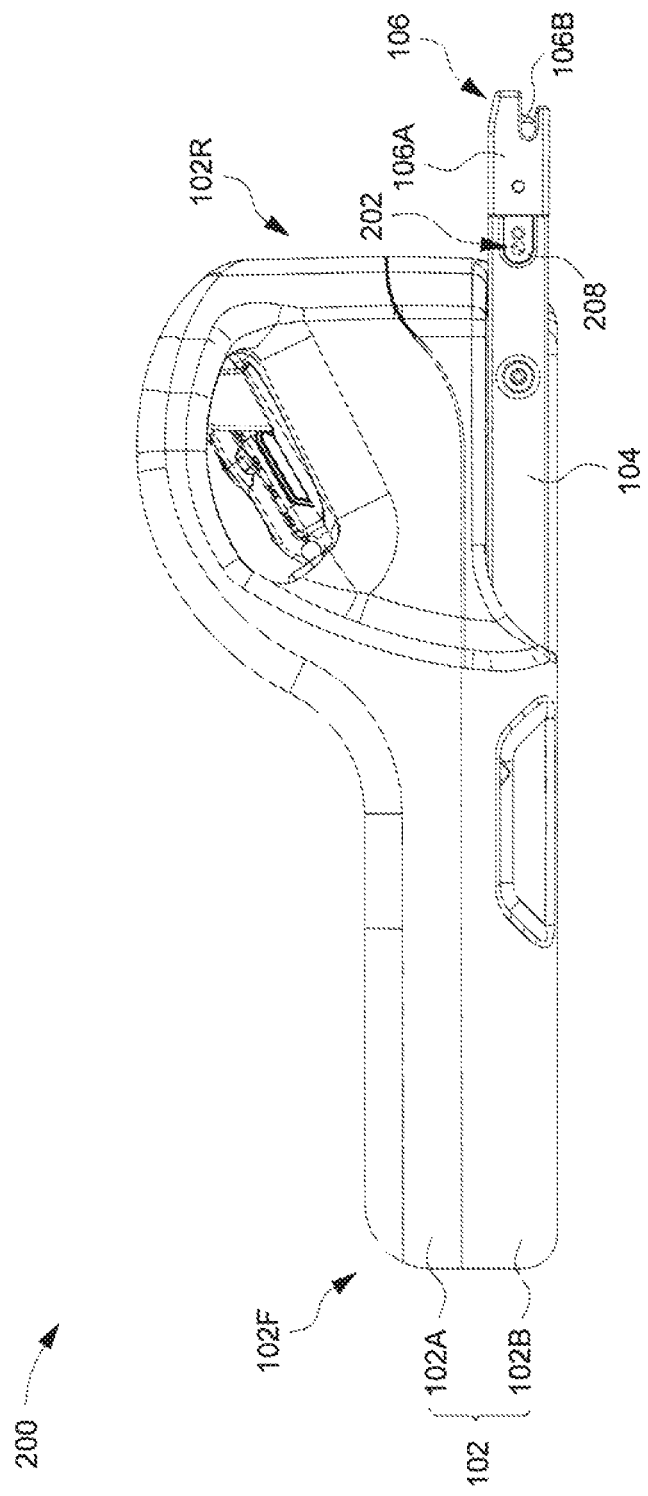
FIG. 5 is a schematic view illustrating a second embodiment of a support base for a child safety seat.

FIG. 5 is a schematic view illustrating a second embodiment of a support base 200 for a child safety seat. The support base 200 can include a shell body 102, adjustable arms 104 and latch assemblies 106 like previously described. One difference lies in the design of the cushion structures 202 (only one is shown in FIG. 5) that are provided symmetrically on the two arms 104 adjacent to the latch assemblies 106.

Figure 6:
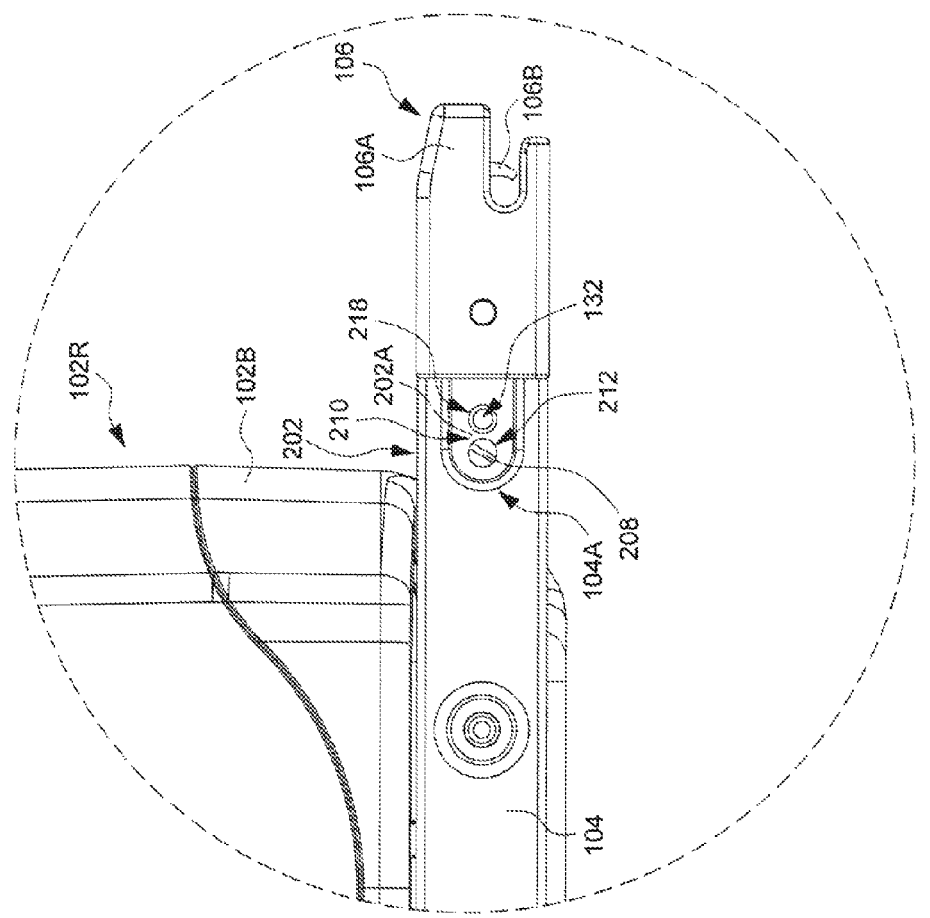
FIG. 6 is an enlarged view illustrating a cushion structure provided in the support base shown in FIG. 5.

FIG. 6 is an enlarged view illustrating one cushion structure 202. The cushion structure 202 can include the rear portion 104A of one arm 104 having two spaced-apart holes 212 and 218 that are disposed along the lengthwise axis of the arm 104 and are isolated from each other via a cushioning portion 202A. The cushioning portion 202A can be made of the same material of the arm 104, and is located adjacent to the holes 212 and 218. A fastener such as rivet 208 can be respectively engaged through the hole 204 of the arm 104 and the hole 130 of the bracket 126 (as better shown in FIG. 2) to affix the bracket 126 with the arm 104 associated therewith. The rivet 208 passing through the hole 204 can be in contact with the cushioning portion 202A.

Figure 7:
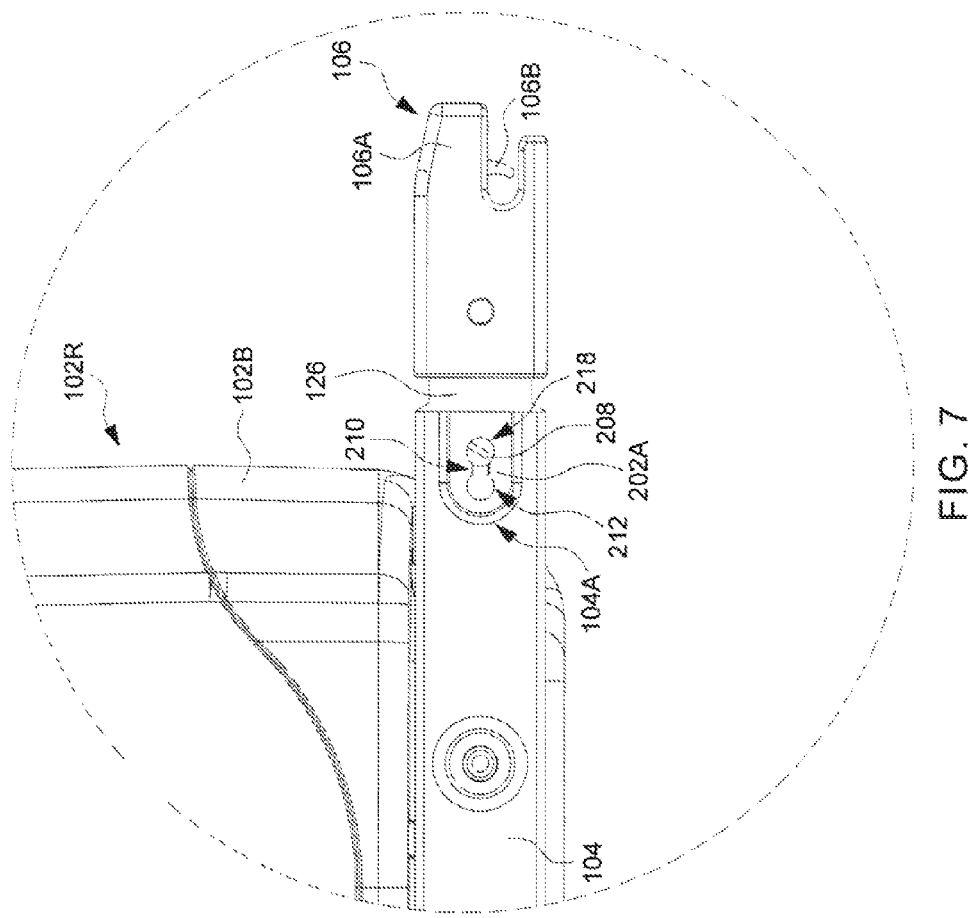
FIG. 7 is a schematic view illustrating exemplary operation of the cushion structure shown in FIG. 6 when the support base is installed in a vehicle.

FIG. 7 is a schematic view illustrating exemplary operation of the cushion structure 202 when the support base 200 is installed in a vehicle. In case the vehicle is subject to a sudden colliding force parallel to the lengthwise axis of the shell body 102 (e.g., when the collision occurs at the front of the vehicle), the inertia of the support base 100 may cause the shell body 102 and the arms 104 to displace away from the attachment points of the latch assemblies 106 with the anchorage fixture of the vehicle. As a result, the rivet 208 can be urged to push against and break at least partially the cushioning portion 202A of the arm 104 between the holes 212 and 218, and move from the hole 212 to the hole 218. The break of the cushioning portion 202A between the holes 212 and 218 may create a trench 210, such that a portion of a collision energy can be dissipated. This cushioned displacement of the shell body 102 and the arms 104 relative to the latch assemblies 106 can dissipate a part of the collision energy to reduce the risk of injury to the child.

Figure 8:
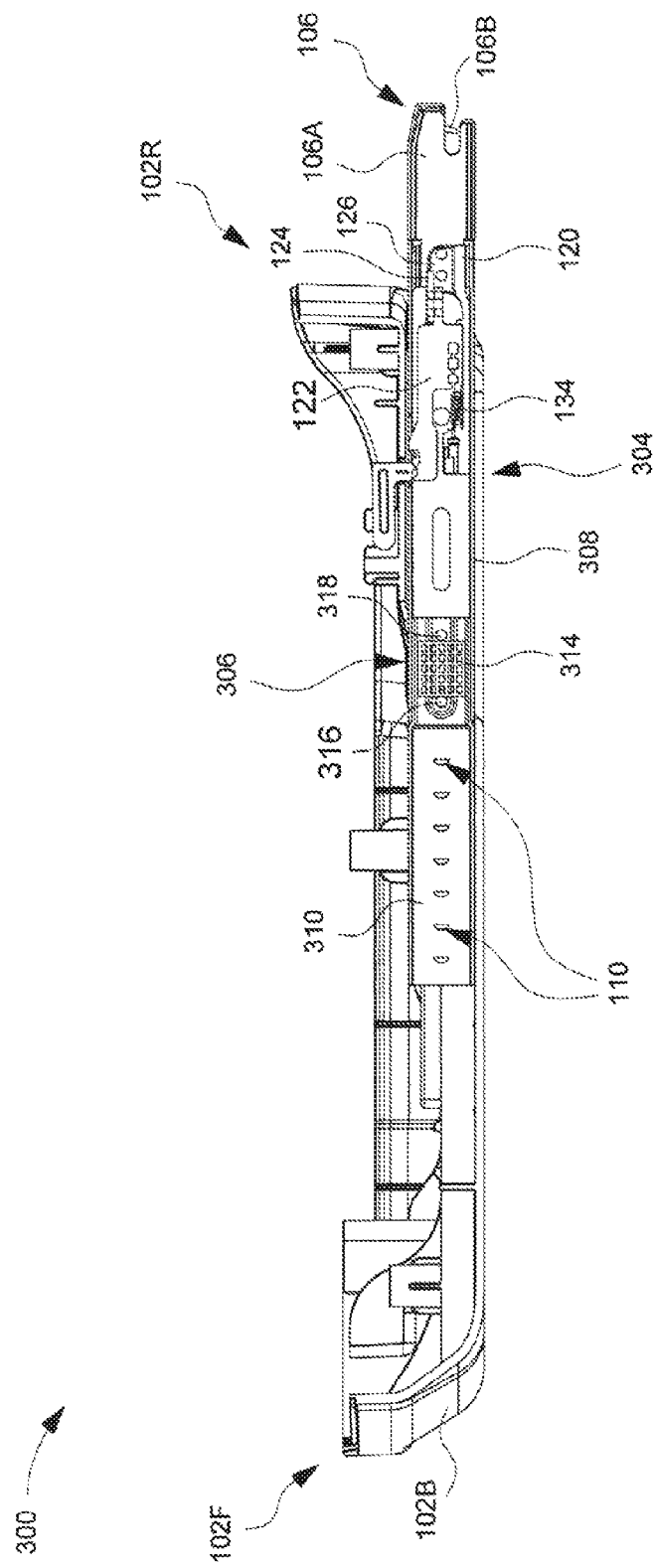
FIG. 8 is a schematic view illustrating a third embodiment of a support base for a child safety seat.

FIG. 8 is a schematic view illustrating a third embodiment of a support base 300. The support base 300 can include the shell body 102, and two adjustable arms 304 of a same construction including the latch assemblies 106 and cushion structures 306 (only one arm 304 with one cushion structure 306 is exemplary shown in FIG. 8, the other one being similar in construction). Each of the arms 304 can include two hollow segments 308 and 310 that can be fixedly connected with each other by partially inserting into each other. The segment 308 can be affixed with the outer casing 106A of the latch assembly 106, and can have an interior through which the extension 120, the sliding part 122 with the projection 124, and the bracket 126 are respectively installed. The locking openings 110 can be distributed lengthwise along the segment 310. The segment 310 can have a portion 310A that is assembled through the interior of the segment 308. The cushion structure 306 can be arranged adjacent to the portion 310A.

Figure 9:
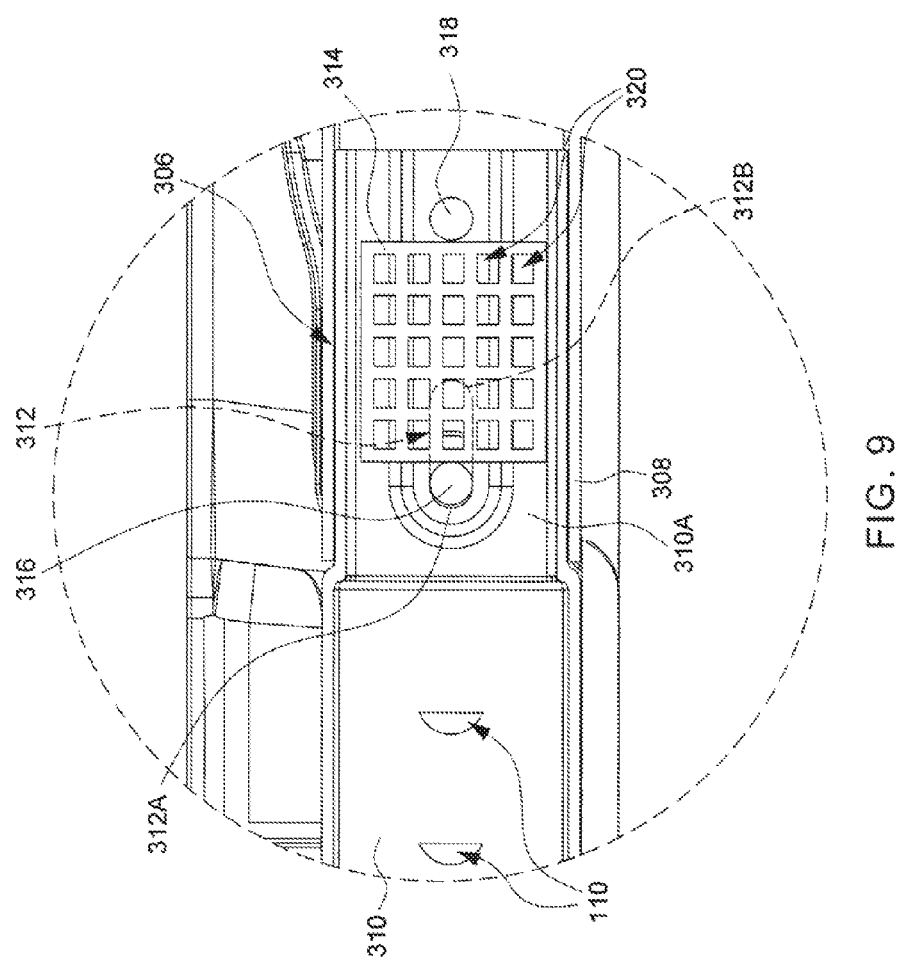
FIG. 9 is an enlarged view illustrating a cushion structure provided in the support base shown in FIG. 8.

FIG. 9 is an enlarged view illustrating the cushion structure 306. The cushion structure 306 can include a cushioning pad 314 that is affixed in an overlapping region between the segments 310 and 308. The segment 310 can include an elongated slot 312 that extends along the lengthwise axis of the arm 304 and has opposite first and second ends 312A and 312B. A rivet 316 can be fixedly engaged with the segment 308, and assembled through the slot 312 adjacent to the first end 312A. An abutment 318 can be affixed with the segment 310 adjacent to the second end 312B of the slot 312. The cushioning pad 314 can be exemplary made of cast aluminum, but any other deformable materials may also be suitable. Moreover, the cushioning pad 314 can also include a plurality of openings 320 to increase the ability of the cushioning pad 314 to deform. The cushioning pad 314 can be disposed between the rivet 316 and the abutment 318, and can at least partially overlap with the slot 312.

Figure 10:
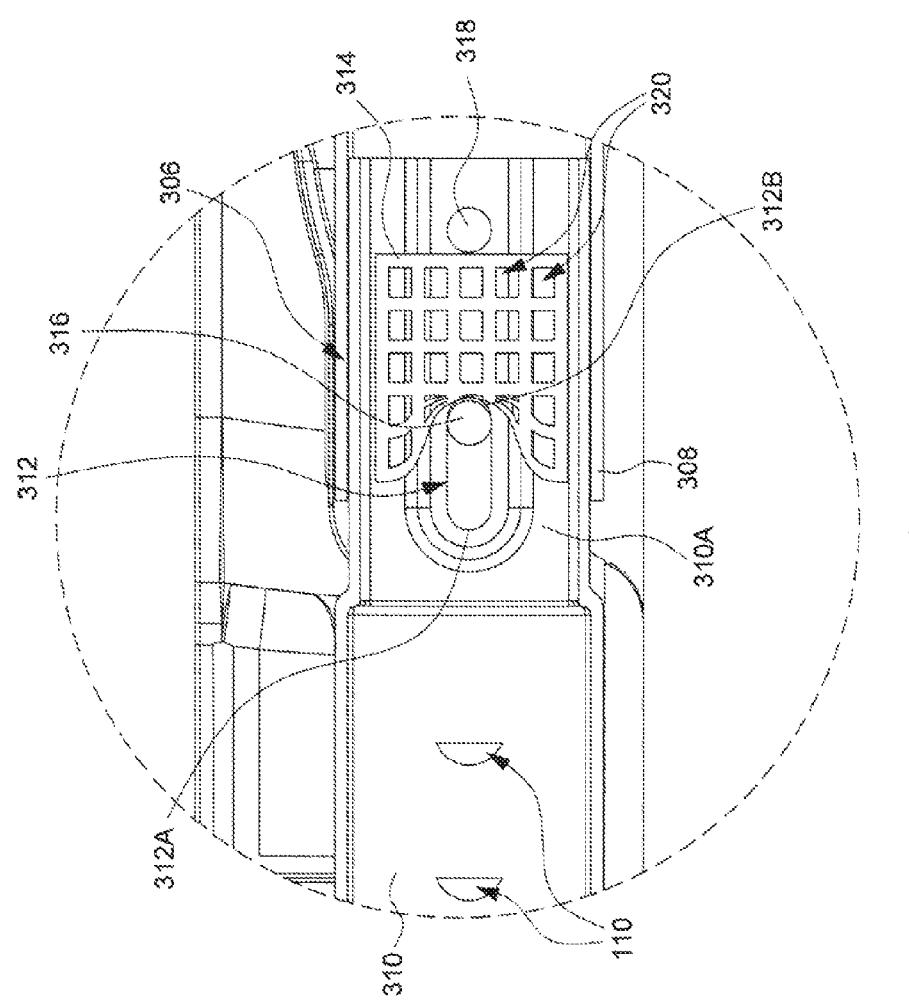
FIG. 10 is a schematic view illustrating exemplary operation of the cushion structure shown in FIG. 9 when the support base is installed in a vehicle.

FIG. 10 is a schematic view illustrating exemplary operation of the cushion structure 306 when the support base 300 is installed in a vehicle. In case the vehicle is subject to a sudden colliding force parallel to the lengthwise axis of the shell body 102 (e.g., when the collision occurs at the front of the vehicle), the inertia of the support base 300 and the seat installed thereon may cause the shell body 102 and the arms 304 to displace away from the attachment points of the latch assemblies 106 with the anchorage fixture of the vehicle. Because the segment 308 is affixed with one associated latch assembly 106, the segment 310 locked with the shell body 102 can urge the rivet 316 to move from the first end 312A toward the second end 312B of the slot 312, which compresses the cushioning pad 314 for absorbing a part of the energy created by the collision. This cushioned displacement of the shell body 102 and the arms 304 relative to the latch assemblies 106 can absorb a part of the collision energy to reduce the risk of injury to the child. It will be appreciated that the cushioning pad 314 may also be used in combination with the cushion structures in any of the support bases described previously.

Figure 11:
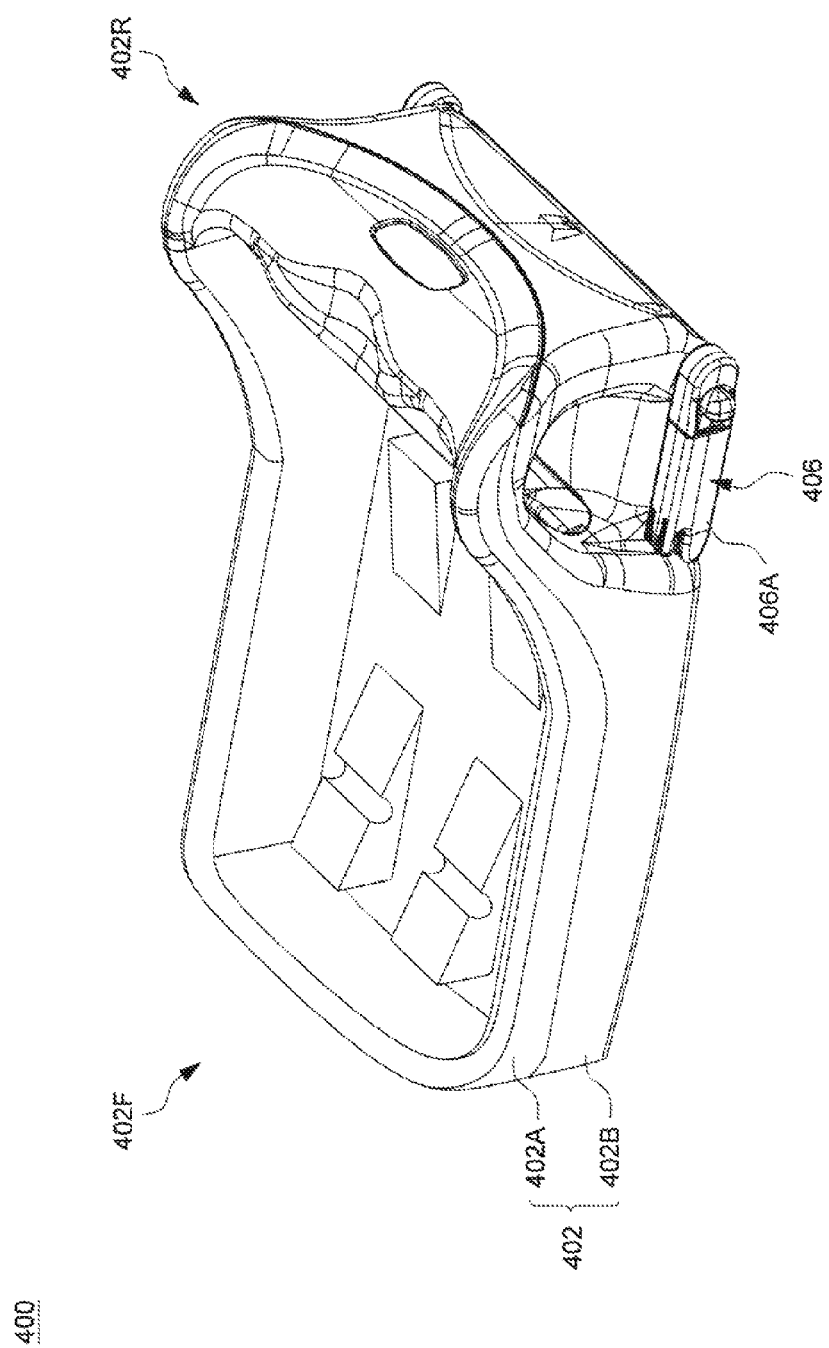
FIG. 11 is a perspective view illustrating a fourth embodiment of a support base for a child safety seat.
Figure 12:
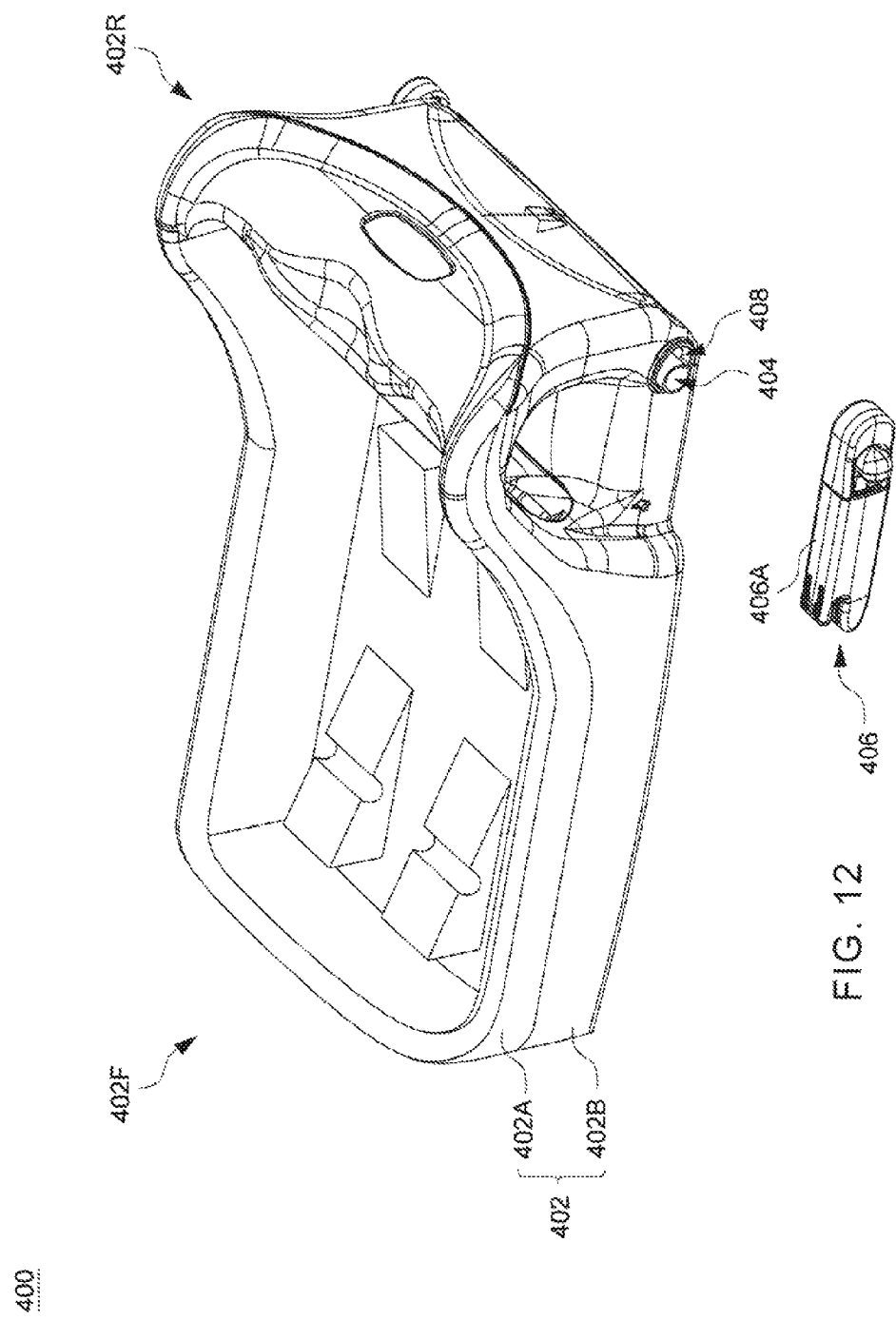
FIG. 12 is a schematic view illustrating a latch assembly detached from the support base shown in FIG. 11.
Figure 13:
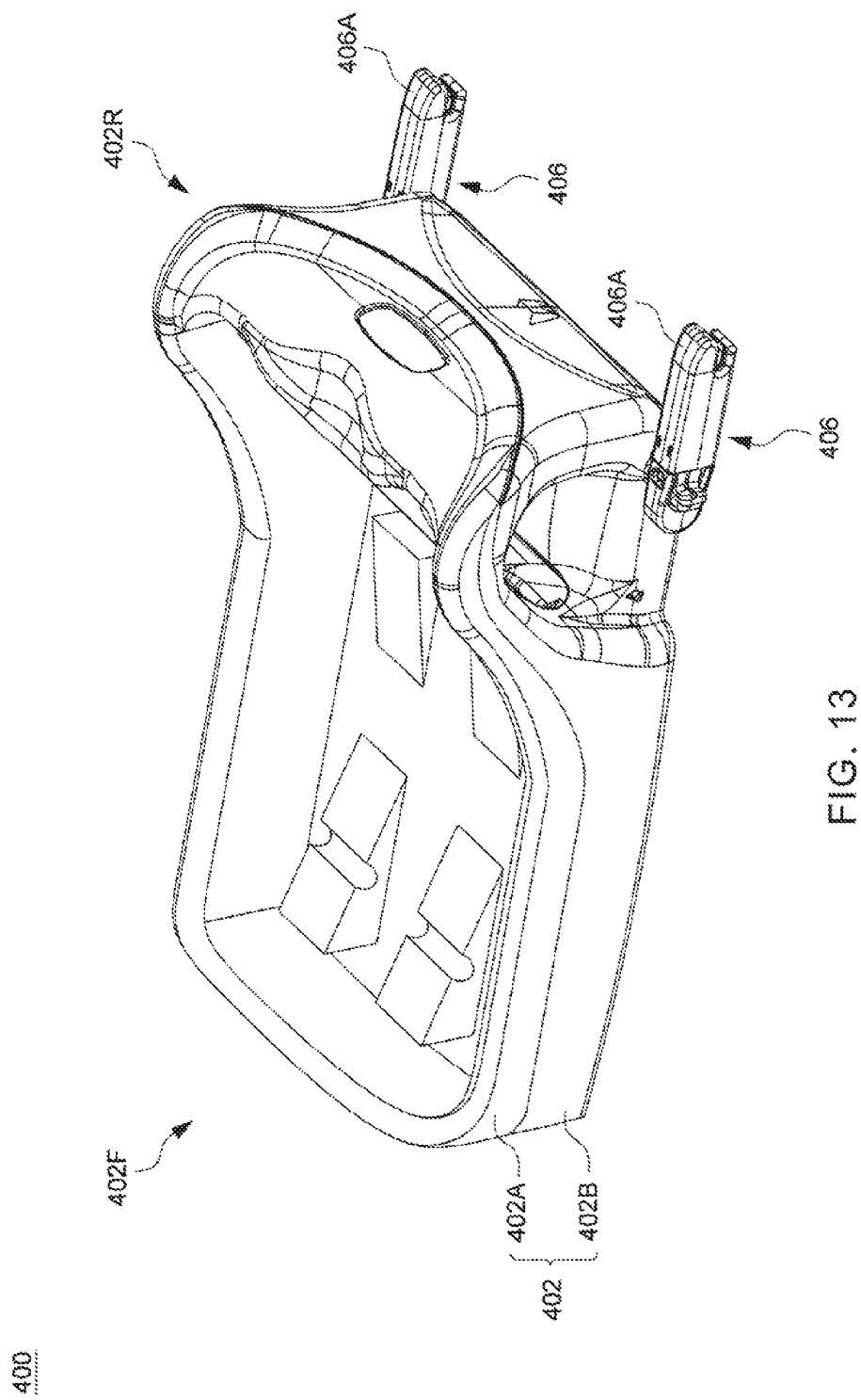
FIG. 13 is a perspective view illustrating the support base shown in FIG. 11 with the latch assemblies in a deployed state.

FIG. 11 is a perspective view illustrating a fourth embodiment of a support base 400 for a child safety seat, FIG. 12 is a schematic view illustrating a latch assembly 406 detached from the support base 400, and FIG. 13 is a perspective view illustrating the support base 400 with the latch assemblies 406 in a deployed state. Referring to FIGS. 11-13, the support base 400 can include a shell body 402 having a rear 402R and a front 402F, an elongated arm 404 extending transversally parallel to a width of the shell body 402, and two latch assemblies 406 connected with the left and right ends of the arm 404. The shell body 402 can be formed from the assembly of upper and lower housing parts 402A and 402B. The upper housing part 402A can have an outer surface having a construction adapted to detachably support a child safety seat (not shown). The lower housing part 402B can have left and right sides symmetrically provided with openings 408 adjacent to the rear 402R of the base 402. Two opposite end portions of the arm 404 can respectively extend through the openings 408, and connect with the latch assemblies 406. The size of the openings 408 may be larger than a cross-section of the two end portions of the arm 404, so that a limited range of displacement of the arm 404 in the openings 408 is permitted. Each latch assembly 406 can include an outer casing 406A that encloses various components of the latch assembly 406.

In FIG. 11, the support base 400 is shown in a configuration in which the latch assemblies 406 are folded toward the shell body 402 for facilitating storage of the support base 400. In FIG. 13, the support base 400 is shown in a configuration in which the latch assemblies 406 are deployed rearward for fastening with the anchorage fixture of a vehicle.

Figure 14:
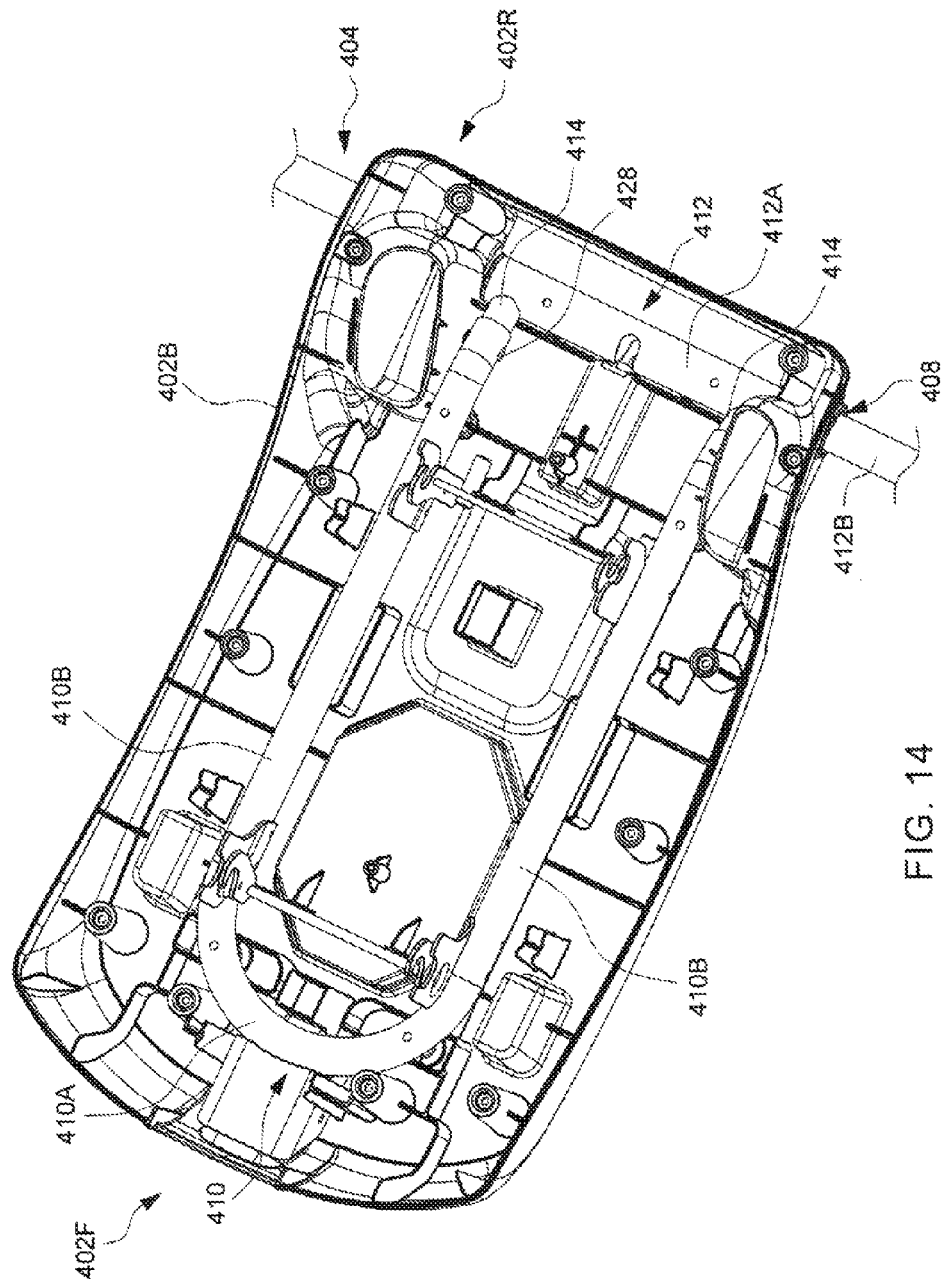
FIG. 14 is a schematic view illustrating an interior of the shell body of the base shown in FIG. 11.

FIG. 14 is a schematic view illustrating an interior of the shell body 402. The interior of the shell body 402 can be affixed with a tubular anchor 410 of a U-shape including a transversal segment 410A and two side segments 410B. The arm 404 can include a transversal segment 412, and two transversally spaced-part extensions 414 projecting from an outer surface of the transversal segment 412. The transversal segment 412 can include a tube portion 412A, and a rod 412B extending transversally through an interior of the tube portion 412A. Two opposite ends of the rod 412B can project outward from the left and right ends of the tube portion 412A, and connect with the latch assemblies 406. The rod 412B can rotate within the tube portion 412A to concurrently turn the two latch assemblies 406 to either of a storage state and a deployed state. The two extensions 414 can be fixedly joined with the tube portion 412A symmetrically at left and right sides relative to a center of the tube portion 412A, and can respectively affix with the side segments 410B of the tubular anchor 410.

Figure 15:
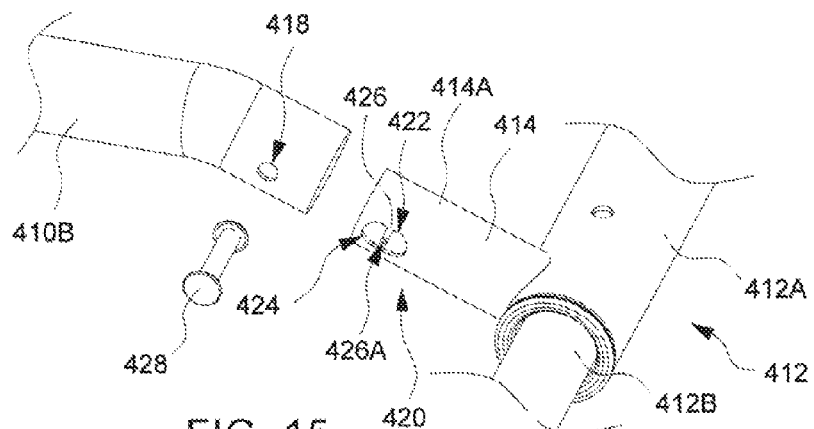
FIG. 15 is an exploded view illustrating the assembly of a tubular anchor with an arm in the shell body shown in FIG. 14.
Figure 16:
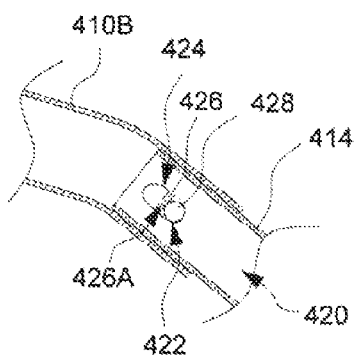
FIG. 16 is a partial cross-sectional view illustrating the tubular anchor shown in FIG. 15 assembled with the arm.

FIG. 15 is an exploded view illustrating the assembly of the tubular anchor 410 with the arm 404, and FIG. 16 is a partial cross-sectional view illustrating the tubular anchor 410 assembled with the arm 404. The side segments 410B of the tubular anchor 410 can have a cross-section that is larger than the extensions 414 in size. The extensions 414 can respectively insert at least partially through the side segments 410B for affixing the arm 404 with the tubular anchor 410.

Each cushion structure 420 can be respectively disposed in the joint region between one side segment 410B of the tubular anchor 410 and one extension 414 of the arm 404. The cushion structure 420 can include a distal portion 414A of the extension 414 having two holes 422 and 424, and an adjacent cushioning portion 426 including a slit 426A connected between the two holes 422 and 424. The cushioning portion 426 can be made of the same material of the extension 414 or arm 404. The slit 426A can be narrower than the holes 422 and 424 in size. The holes 422 and 424 and the slit 426A may be distributed along an axis of insertion of the extension 414 through the side segment 410B.

Once the extension 414 is put in place through the associated side segment 410B, a hole 418 formed through the side segment 410B can be aligned with the hole 422 of the extension 414. A fastener such as rivet 428 then can be engaged through the hole 418 of the side segment 410B and the hole 422 of the extension 414 in contact with the cushioning portion 426 to fixedly fasten the tubular anchor 410 with the arm 404. The rivet 428 can be greater than the size of the slit 426A, so that the rivet 428 cannot easily move through the slit 426A once it is engaged through the hole 422.

Figure 17:
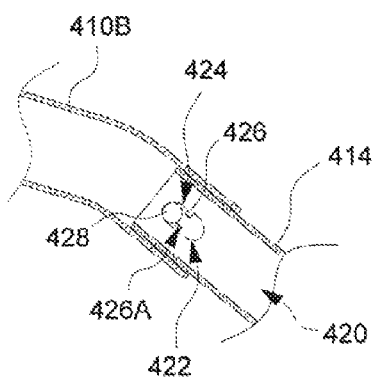
FIG. 17 is a schematic view illustrating exemplary operation of the cushion structure shown in FIG. 15 when the support base is installed in a vehicle.
Figure 18:
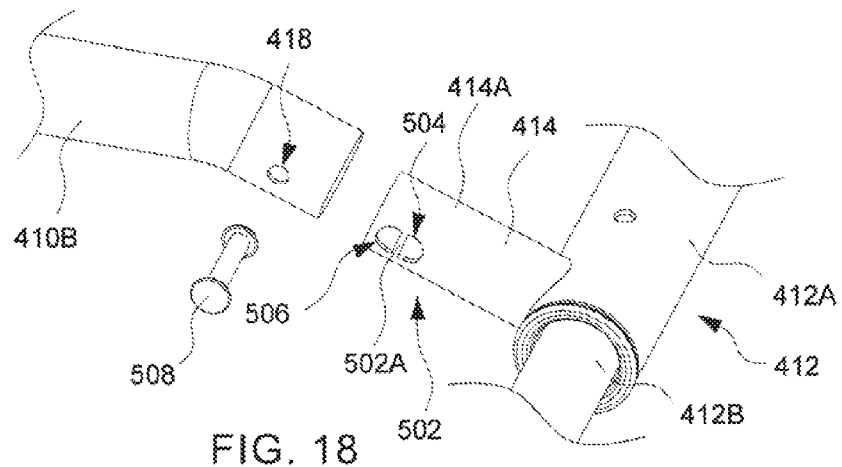
FIG. 18 is a schematic view illustrating another cushion structure that can be used in the support base shown in FIG. 11.

FIG. 17 is a schematic view illustrating exemplary operation of the cushion structure 420 when the support base 400 is installed in a vehicle. In case the vehicle is subject to a sudden colliding force parallel to the lengthwise axis of the shell body 402 (e.g., when the collision occurs at the front of the vehicle), the inertia of the support base 400 and the seat installed thereon may cause the shell body 402 and the tubular anchor 410 to displace toward the front 402F of the shell body 402 away from the attachment points of the latch assemblies 406 with the anchorage fixture of the vehicle. As a result, the rivet 428 affixed with each side segment 410B can be urged to move relative to the extension 414 of the arm 404 from the hole 422 to the hole 424 through the cushioning portion 426. Because the size of the slit 426A is smaller than that of the rivet 428, some frictional resistance can be generated against the displacement of the rivet 428 through the slit 426A to dissipate the collision energy. This cushioned displacement of the shell body 402 and the tubular anchor 410 relative to the latch assemblies 406 can dissipate a part of the collision energy to reduce the risk of injury to the child.

Figure 19:
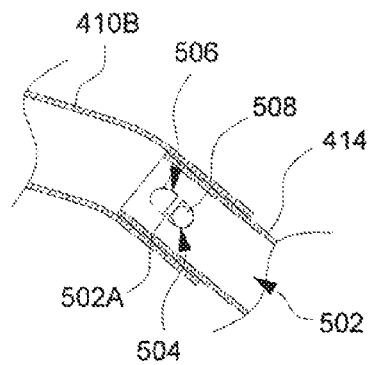
FIG. 19 is a schematic view illustrating the cushion structure of FIG. 18 disposed adjacent to a joint region of a tubular anchor with an arm in the support base.

In conjunction with FIGS. 11-14, FIG. 18 is a schematic view illustrating an embodiment of a cushion structure 502 that can be used in replacement of the cushion structure 420 in the support base 400, and FIG. 19 is a schematic view illustrating a cushion structure 502 disposed adjacent to a joint region of the tubular anchor 410 with the arm 404. Each of the cushion structures 502 can be respectively disposed in the joint region between one side segment 410B of the tubular anchor 410 and one extension 414 of the arm 404. The cushion structure 502 can include the distal portion 414A of the extension 414 having two spaced-apart holes 504 and 506 isolated from each other via a cushioning portion 502A. The cushioning portion 502A may be made of the same material of the extension 414 or arm 404. The holes 504 and 506 may be distributed along an axis of insertion of the extension 414 through the side segment 410B.

Once the extension 414 is put in place through the associated side segment 410B, the hole 418 formed through the side segment 410B can be aligned with the hole 504 of the extension 414. A fastener such as rivet 508 then can be engaged through the hole 418 of the side segment 410B and the hole 504 of the extension 414 to fixedly fasten the tubular anchor 410 with the arm 404.

Figure 20:
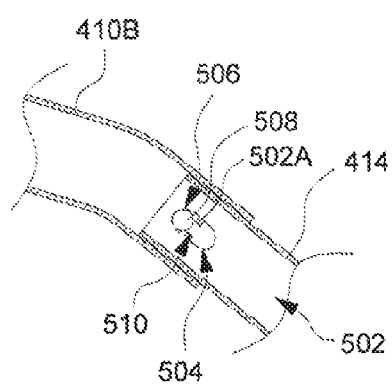
FIG. 20 is a schematic view illustrating exemplary operation of the cushion structure shown in FIG. 19 when the support base is installed in a vehicle.

FIG. 20 is a schematic view illustrating exemplary operation of the cushion structure 502 when the support base 400 is installed in a vehicle. In case the vehicle is subject to a sudden colliding force parallel to the lengthwise axis of the shell body 402, the inertia of the support base 400 and the seat installed thereon can cause the shell body 402 and the tubular anchor 410 to move toward the front 402A away from the attachment points of the latch assemblies 406 with the anchorage fixture of the vehicle. As a result, the rivet 508 affixed with each side segment 410B can be urged to break the cushioning portion 502A of the extension 414 between the holes 504 and 506, and move relative to the extension 414 from the hole 504 to the hole 506. The break of the cushioning portion 502A between the holes 504 and 506 may create a trench 510 in the extension 414 to dissipate collision energy. This cushioned displacement of the shell body 402 and the tubular anchor 410 relative to the latch assemblies 406 can dissipate a part of the collision energy to reduce the risk of injury to the child.

Figure 21:
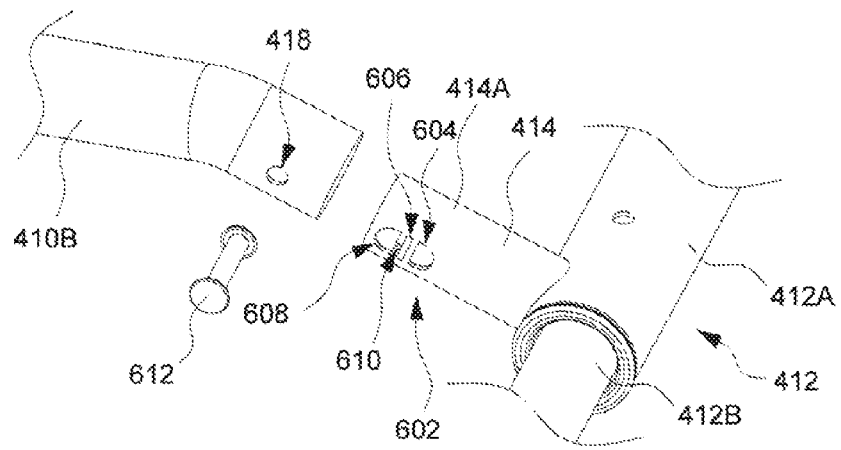
FIG. 21 is a schematic view illustrating another cushion structure that can be used in the support base shown in FIG. 11.
Figure 22:
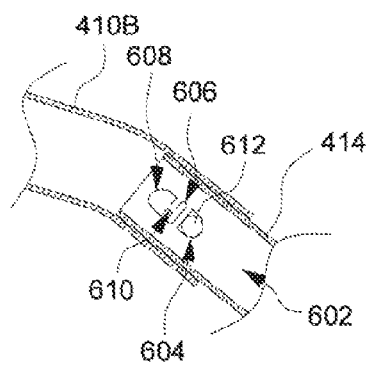
FIG. 22 is a schematic view illustrating a cushion structure shown in FIG. 21 disposed adjacent to a joint region of a tubular anchor with an arm in the support base.

FIG. 21 is a schematic view illustrating another cushion structure 602 that can be used in replacement of the cushion structure 420 in the support base 400, and FIG. 22 is a schematic view illustrating a cushion structure 602 disposed adjacent to a joint region of the tubular anchor 410 with the arm 404 in the support base. Each of the cushion structures 602 can be respectively disposed in the joint region between one side segment 410B of the tubular anchor 410 and one extension 414 of the arm 404. The cushion structure 602 can include the distal portion 414A of the extension 414 having three spaced-apart holes 604, 606 and 608, and a slit 610. The holes 604, 606 and 608 and the slit 610 can be distributed along an axis of insertion of the extension 414 through the side segment 410B, the hole 606 being located between the holes 604 and 608. The slit 610 can be connected between the holes 606 and 608, and the holes 604 and 606 can be isolated from each other via a solid sidewall of the extension 414. In alternate embodiments, the holes 604 and 606 may also be connected with each other via a slit, or the holes 606 and 608 may be isolated from each other via a solid sidewall. Like previously described, the solid material of the extension 414 between the holes 604 and 606, and between the holes 606 and 608 can form cushioning portions.

Once the extension 414 is put in place through the associated side segment 410B, the hole 418 formed through the side segment 410B can be aligned with the hole 604 of the extension 414. A rivet 612 then can be engaged through the hole 418 of the side segment 410B and the hole 604 of the extension 414 to fixedly fasten the tubular anchor 410 with the arm 404.

Figure 23:
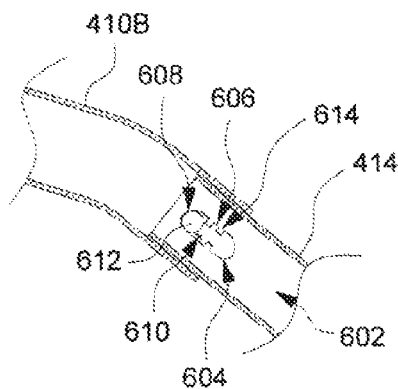
FIG. 23 is a schematic view illustrating exemplary operation of the cushion structure shown in FIG. 22 when the support base is installed in a vehicle.

In conjunction with FIG. 11, FIG. 23 is a schematic view illustrating exemplary operation of the cushion structure 602 when the support base is installed in a vehicle. In case the vehicle is subject to a sudden colliding force parallel to the lengthwise axis of the shell body 402 (e.g., when the collision occurs at the front of the vehicle), the inertia of the support base and the seat installed thereon may cause the shell body 402 and the tubular anchor 410 to displace away from the arm 404. As a result, the rivet 612 affixed with each side segment 410B can be urged to break the solid material of the extension 414 between the holes 604 and 606 (which creates a trench 614), and move from the hole 604 to the hole 606.

In case the collision is stronger, the rivet 612 may move further from the hole 606 via the slit 610 to the hole 608 after breaking the material of the extension 414 between the holes 604 and 606. Because the size of the slit 610 is smaller than that of the rivet 612, some frictional resistance can be generated against the displacement of the rivet 612 through the slit 610 to dissipate collision energy. This gradual cushioned displacement of the shell body 402 and the tubular anchor 410 relative to the latch assemblies 406 can dissipate a part of the collision energy to reduce the risk of injury to the child.

Figure 24:
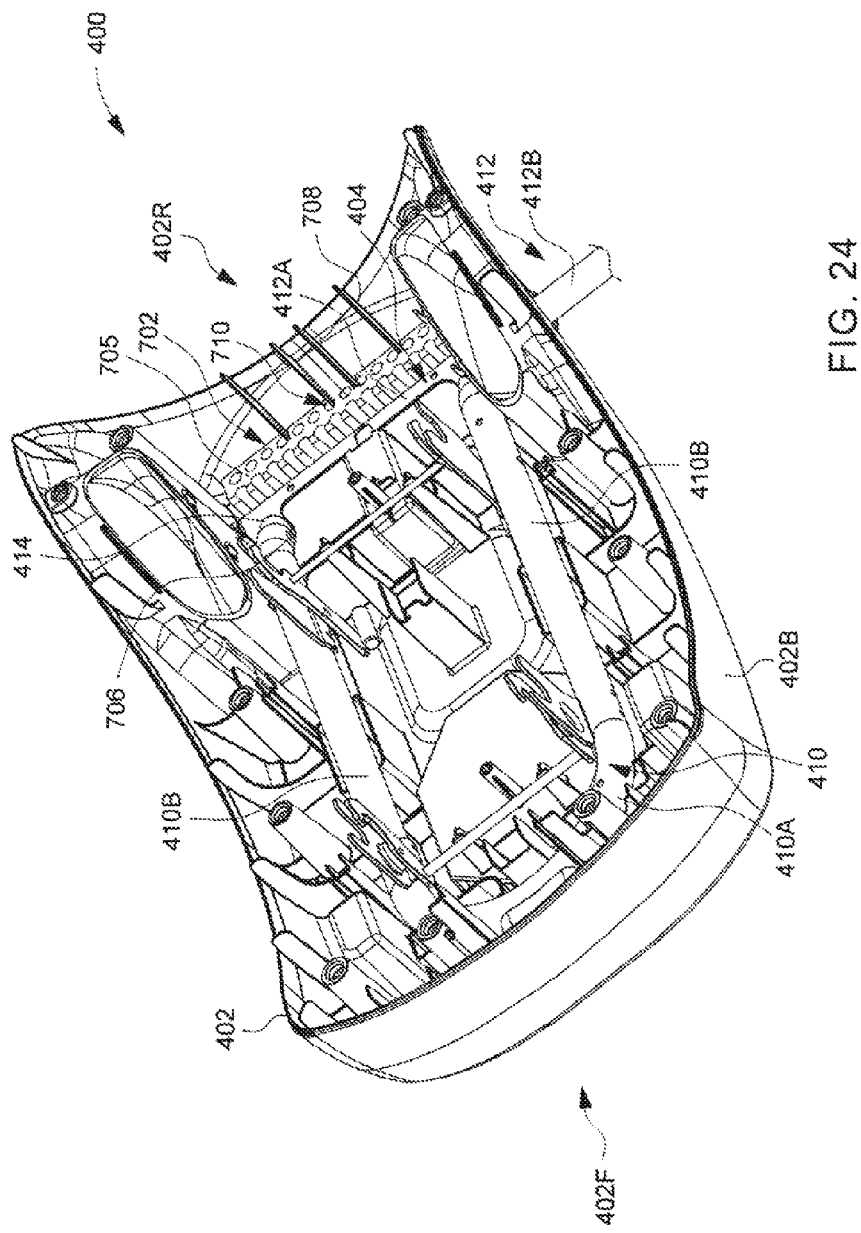
FIG. 24 is a perspective view illustrating another variant cushion structure that can be used in the support base shown in FIG. 11.
Figure 25:
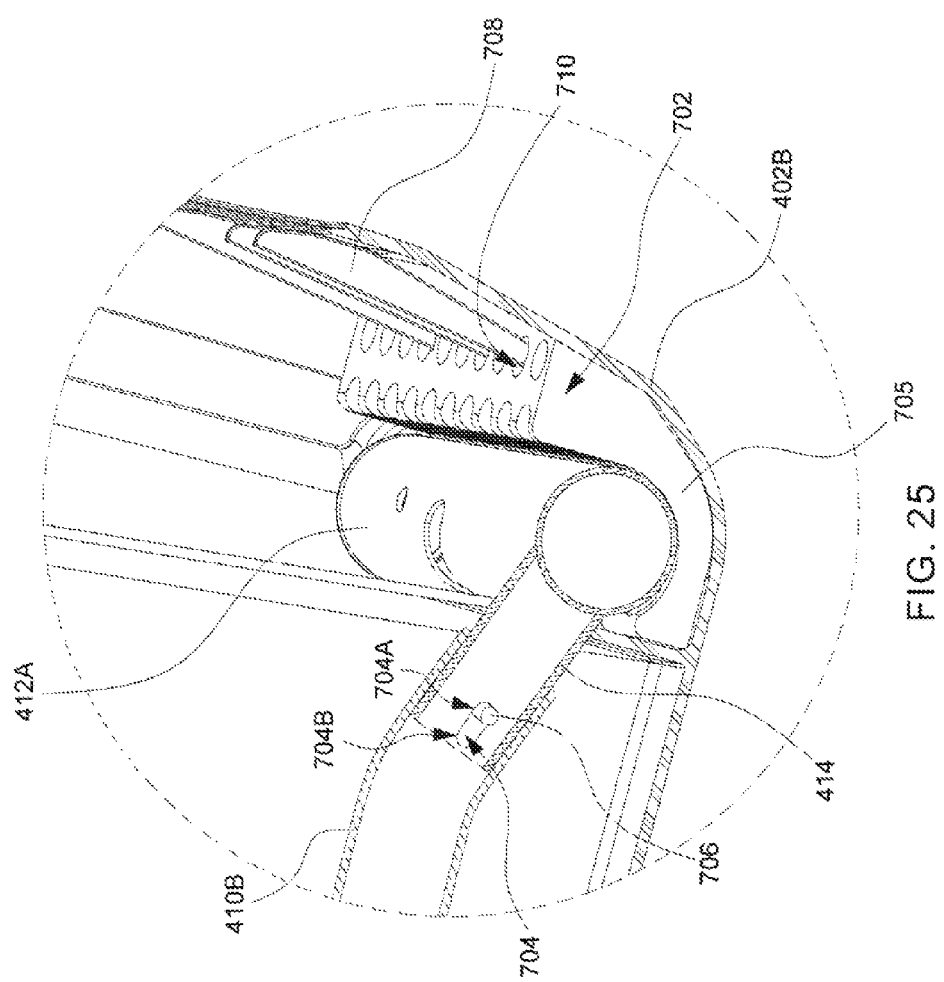
FIG. 25 is a partially enlarged view illustrating the assembly of the cushion structure shown in FIG. 24.

FIG. 24 is a perspective view illustrating another cushion structure 702 that can be used in the support base 400, and FIG. 25 is a partially enlarged view illustrating a cushion structure 702 provided in the shell body 402 of the support base. In this embodiment, the extension 414 can include an elongated slot 704 having first and second ends 704A and 704B. Once the extension 414 is put in place through the associated side segment 410B, a rivet 706 can be engaged through the side segment 410B and guided through the slot 704 of the extension 414 to movably connect the tubular anchor 410 with the arm 404.

The cushion structure 702 can include a cushioning pad 705 that is disposed in the base 402 at a position between the arm 404 and an inner sidewall of the shell body 402. A plurality of ribs 708 can protrude from an inner sidewall of the shell body 402, and engage with a plurality of mount slots 710 formed through the cushioning pad 705 to affix the cushioning pad 705 with the shell body 402.

Figure 26:
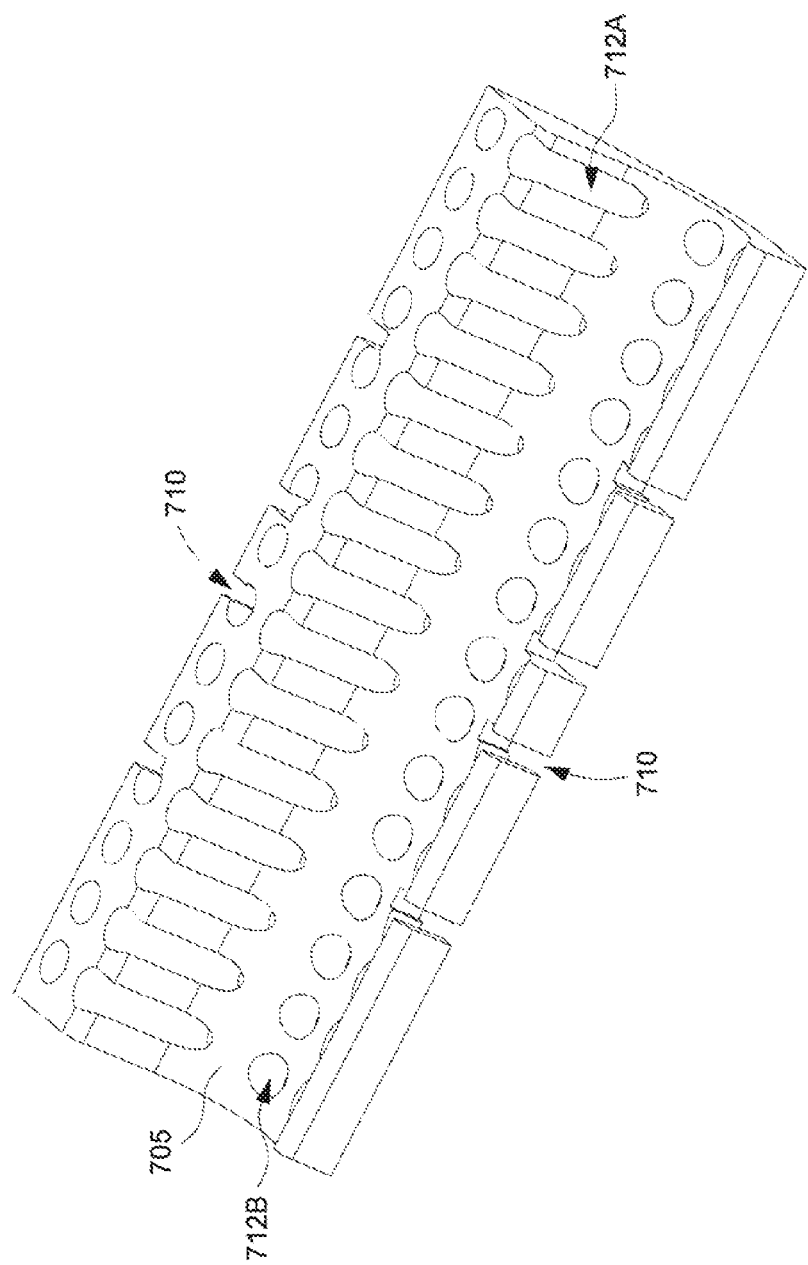
FIG. 26 is a perspective view of a cushioning pad of the cushion structure shown in FIG. 25.

FIG. 26 is a perspective view of the cushioning pad 705. The cushioning pad 705 can be made in a single piece made of cast aluminum. The mount slots 710 can be disposed on upper and lower edges of the cushioning pad 705. The cushioning pad 705 can also include a plurality of elongated openings 712A and circular openings 712B. The elongated openings 712A can be disposed adjacent to the mount slots 710 at the upper edge of the cushioning pad 705, and the circular openings 712B can be disposed adjacent to the mount slots 710 at the lower edge of the cushioning pad 705.

FIG. 27 is a schematic view illustrating exemplary operation of the cushion structure 702 when the support base is installed in a vehicle. In case the vehicle is subject to a sudden colliding force parallel to the lengthwise axis of the shell body 402 (e.g., when the collision occurs at the front of the vehicle), the inertia of the support base 400 and the seat installed thereon may cause the shell body 402 and the tubular anchor 410 to displace away from the arm 404 and the latch assemblies 406 fixedly attached with the anchorage fixture of the vehicle. As a result, the rivet 706 affixed with each side segment 410B can be urged to move along the slot 704 from the first end 704A to the second end 704B. Moreover, the tube portion 412A of the transversal segment 412 can press against the cushioning pad 705 and causes its deformation. It is worth noting that the slot 704 and rivet 706 may be replaced with any of the cushion structures described previously in FIGS. 15 through 23 for use in combination with the cushioning pad 705.

While the cushion structures have been described as being implemented in support bases, it will be appreciated that the cushion structures can also be formed with the seat body so that the seat body can be directly attached with the anchorage fixture of the vehicle. Alternatively, the support base and the seat portion may also formed in a unitary body.

The bases described herein can include cushion structures that can allow cushioned displacement of the shell body relative to the attachment points of the latch assemblies with the anchorage fixture of the vehicle. As a result, the cushion structures can absorb a part of the collision energy occurring during collision of the vehicle to reduce the risk of injury to the child.

Realizations of the support bases for child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A support base for a child safety seat, comprising:
   a shell body;
   an adjustable arm assembled with the shell body;
   a latch assembly provided at an end of the adjustable arm and affixed with a bracket, the latch assembly being operable to fixedly attach the shell body with an anchorage fixture of a vehicle; and
   a cushion structure coupled with the shell body and operable to allow a cushioned displacement of the shell body relative to the latch assembly when the child safety seat is subject to collision, wherein the cushion structure includes a portion of the adjustable arm configured as a solid cushioning portion, and a fastener engaging through the adjustable arm and the bracket at a position adjacent to the cushioning portion to fixedly fasten the bracket with the adjustable arm, the fastener pushing against the cushioning portion when collision occurs for absorbing a part of the collision energy.

2. The support base according to claim 1, being adapted to detachably assemble with a child safety seat.

3. The support base according to claim 1, wherein the fastener engages through the adjustable arm and the bracket in contact with the cushioning portion.

4. The support base according to claim 3, wherein the fastener engages through a first hole of the adjustable arm to affix the adjustable arm with the bracket, the portion of the arm further includes a second hole, and the cushioning portion is located between the first and second holes, the fastener moving from the first hole through the cushioning portion toward the second hole when collision occurs.

5. The support base according to claim 4, wherein the cushioning portion includes a slit connected with the first and second holes.

6. The support base according to claim 4, wherein the portion of the arm further includes a third hole, the second hole is located between the first and third holes, and a second cushioning portion is defined between the second hole and the third hole.

7. The support base according to claim 3, wherein the cushioning portion includes a cushioning pad made of cast aluminum.

8. The support base according to claim 1, wherein the cushioning portion is made of a material of the adjustable arm.

9. The support base according to claim 3, wherein the fastener breaks at least partially the cushioning portion when collision occurs.

10. The support base according to claim 3, wherein the adjustable arm is movable along a lengthwise axis of the shell body to adjust a length at which the latch assembly extends from a rear of the shell body.

11. The support base according to claim 3, wherein the arm extends transversally along a width of the shell body, and the latch assembly is connected with the arm.

12. The support base according to claim 11, wherein the shell body includes two openings through which the arm extends outward from the shell body, the openings being larger than a width of the arm.

13. The support base according to claim 3, wherein the shell body includes a fixed tubular anchor that is connected with the arm, and the cushion structure is disposed adjacent to a joint region of the arm with the tubular anchor.

14. The support base according to claim 1, wherein the arm includes a first and a second segment connected with each other, and the cushion structure includes a cushioning pad that is affixed in an overlapping region between the first and second segments.

15. The support base according to claim 1, wherein the arm extends transversally along a width of the shell body, and the cushion structure includes a cushioning pad affixed with the shell body at a location between the arm and an internal sidewall of the shell body.

16. A child safety seat assembly comprising:
   the support base according to claim 1; and
   a child safety seat arranged on the support base.

17. A support base for a child safety seat, comprising:
   a shell body;
   an arm connected with the shell body;
   a latch assembly provided at an end of the arm, the latch assembly being operable to fixedly attach the shell body with an anchorage fixture of a vehicle; and
   a cushion structure disposed respectively adjacent to the arm and the latch assembly, wherein the cushion structure is operable to allow a cushioned displacement of the shell body along with the arm relative to the latch assembly when the child safety seat is subject to collision.

18. The support base according to claim 17, wherein the cushion structure includes a portion of the arm having a first hole and a solid cushioning portion adjacent to each other, the arm is connected with the shell body, and a fastener passes through the first hole and is in contact with the cushioning portion, the fastener pushing against the cushioning portion when collision occurs.

19. The support base according to claim 17, wherein the cushioning portion is affixed with the shell body.

* * * * *